2,895,791

SEPARATION PROCESS FOR PROTACTINIUM AND COMPOUNDS THEREOF

Quentin Van Winkle, Columbus, Ohio, assignor to the United States of America as represented by the United States Atomic Energy Commission No Drawing. Application January 19, 1950
Serial No. 139,531

20 Claims. (Cl. 23—14.5)

This invention relates to compounds of protactinium and to a process for the separation of protactinium from aqueous solutions. The present process more especially relates to the separation of protactinium from its mixtures with thorium, uranium, fission products, and various combinations of these elements.

Protactinium occurs in nature as the decay product of uranium Y, a short-lived beta-emitting thorium isotope which in turn is formed from the very long-lived uranium isotope, $U^{235}$, found to the extent of 0.7% in natural uranium. Protactinium, therefore, occurs naturally only in uranium ores, and to the extent of about 0.25 part protactinium per million parts of uranium, this value being fixed by the relative decay rates of $U^{235}$ and $Pa^{231}$. For comparison, radium is present at 0.35 part per million of uranium. The formidable task of isolating protactinium occurring in such a minute concentration is somewhat lightened by the availability of waste fractions from the commercial processing of uranium ores which contain slightly greater concentrations of protactinium and which are more amenable to chemical treatment than the raw ores. During the processing of such uranium ores the major portion of the uranium and some of the other constituents are dissolved in nitric acid. By the addition of sodium carbonate some of the dissolved impurities, which include protactinium, polonium, ionium ($Th^{230}$), and radium are precipitated. This sodium carbonate precipitate is available for recovery of protactinium by separation from thorium and the other constituents.

With the development of the uranium-graphite pile for production of plutonium, fission products, and energy, it was found that an increased utilization of neutrons could be accomplished by the use of a blanket of thorium or a thorium-containing material around the pile. By the use of this blanket the thorium isotope, $Th^{232}$, absorbed neutrons to form $Th^{233}$, which decayed by beta-emission to $Pa^{233}$. This protactinium isotope decayed by beta-emission to $U^{233}$. The half-lives of $Th^{233}$ and $Pa^{233}$ are twenty-three minutes and twenty-seven and four/tenths days, respectively. Since $U^{233}$ is fissionable, it is desirable to remove it from the thorium blanket before the concentration of $U^{233}$ becomes very high. Otherwise, there are fission products of $U^{233}$ in the blanket so that the purification of thorium for re-use in the blanket cannot be carried out by a simple procedure. This purification of thorium could be accomplished by removing the blanket from the pile after a certain period of irradiation and storing the blanket for a sufficient period of time to allow substantially all of the protactinium present to decay to $U^{233}$. In such a case it would be necessary only to separate $U^{233}$ from thorium. However, this would necessitate the storage of the material for a considerable length of time. By the use of a storage period in a purification process the amount of time that thorium could be used as a blanket would be much less than in the case of a purification process requiring no storage period. To eliminate the storage period from the purification process it is necessary to separate protactinium as well as uranium from thorium.

This can be accomplished either by first removing $U^{233}$ by known processes and then separating $Pa^{233}$ from thorium or by separating $U^{233}$ and $Pa^{233}$ simultaneously from thorium. The amounts of $Pa^{233}$ and $U^{233}$ produced by the neutron-irradiation of thorium are quite small, rarely being above 1% by weight of thorium and usually being substantially below this concentration. Thus, it is necessary to recover $Pa^{233}$ and $U^{233}$ from thorium masses having $U^{233}$ and $Pa^{233}$ concentrations below one part per thousand parts and even one part per million parts of thorium.

When the thorium blanket is used for a considerable period without treatment for removal of protactinium and $U^{233}$ formed, some of the $U^{233}$ will be fissioned by neutrons with the result that fission products thereof are also present. This complicates the problem of recovery of protactinium, namely, $Pa^{233}$, from the neutron-irradiated thorium. In other words, it becomes necessary to separate protactinium from fission products, as well as from thorium and uranium, including any uranium impurity in the thorium used.

In all of the foregoing materials containing protactinium the materials are dissolved by strong inorganic acids and the resultant aqueous solutions usually contain very dilute concentrations of protactinium salts.

It is an object of the present invention to provide new compounds of protactinium.

A second object of this invention is to provide a process for the separation of protactinium from an aqueous solution of a protactinium salt.

A third object of the present invention is to provide a process for separating protactinium from aqueous solutions containing salts of protactinium and thorium.

Another object of this invention is to separate a mixture of protactinium and uranium present in aqueous solutions containing salts thereof.

It is a further object of the present invention to provide a process for separating protactinium from mixtures of protactinium, thorium, and uranium, and especially for separating protactinium from such mixtures also containing fission products.

Still another object of this invention is to separate protactinium from rare earth elements admixed therewith.

Other objects of this invention will be apparent from the description which follows:

I have found that a suitable separation of protactinium from an acidic aqueous solution of a pentavalent salt of protactinium can be obtained by contacting an acidic aqueous solution with a certain type of chelating agent alone or as an organic solvent solution to form a pentavalent protactinium chelate compound. When the organic solvent is present the chelate compound of the pentavalent protactinium is extracted; otherwise, it is separated by filtration or other suitable means.

The chelating agent of the present invention is a fluorinated β-diketone having the general formula:

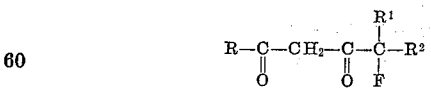

wherein R is a member of the group consisting of alkyl, aryl, aralkyl, alkaryl, and heterocyclic radicals and $R^1$ and $R^2$ are members of the group consisting of hydrogen and fluorine. Of course, the R group may contain various substituents such as halogen groups and nitro groups. It is preferred that $R^1$ and $R^2$ are both fluorine atoms and examples of such a class of compounds are:

Trifluoroacetylacetone

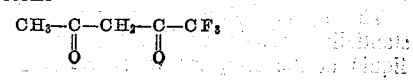

Propionyltrifluoroacetone $$CH_3-CH_2-\underset{\underset{O}{\|}}{C}-CH_2-\underset{\underset{O}{\|}}{C}-CF_3$$

Isovaleryltrifluoroacetone $$(CH_3)_2CH-CH_2-\underset{\underset{O}{\|}}{C}-CH_2-\underset{\underset{O}{\|}}{C}-CF_3$$

Heptanoyltrifluoroacetone $$C_6H_{13}-\underset{\underset{O}{\|}}{C}-CH_2-\underset{\underset{O}{\|}}{C}-CF_3$$

Benzoyltrifluoroacetone $$C_6H_5-\underset{\underset{O}{\|}}{C}-CH_2-\underset{\underset{O}{\|}}{C}-CF_3$$

2-thenoyltrifluoroacetone $$\underset{H-C}{\overset{H-C-C-H}{\underset{\diagdown S \diagup}{\|}}}\overset{\|}{C}-\underset{\underset{O}{\|}}{C}-CH_2-\underset{\underset{O}{\|}}{C}-CF_3$$

p-Fluorobenzoyltrifluoroacetone $$F-\bigcirc-\underset{\underset{O}{\|}}{C}-CH_2-\underset{\underset{O}{\|}}{C}-CF_3$$

p-Phenylbenzoyltrifluoroacetone $$\bigcirc-\bigcirc-\underset{\underset{O}{\|}}{C}-CH_2-\underset{\underset{O}{\|}}{C}-CF_3$$

β-Naphthoyltrifluoroacetone $$\bigcirc\hspace{-0.5em}\bigcirc-\underset{\underset{O}{\|}}{C}-CH_2-\underset{\underset{O}{\|}}{C}-CF_3$$

2-furoyltrifluoroacetone $$\underset{H-C}{\overset{H-C-C-H}{\underset{\diagdown O \diagup}{\|}}}\overset{\|}{C}-\underset{\underset{O}{\|}}{C}-CH_2-\underset{\underset{O}{\|}}{C}-CF_3$$

Phenylacetyltrifluoroacetone $$C_6H_5-CH_2-\underset{\underset{O}{\|}}{C}-CH_2-\underset{\underset{O}{\|}}{C}-CF_3$$

3-phenylpropionyltrifluoroacetone $$C_6H_5-CH_2-CH_2-\underset{\underset{O}{\|}}{C}-CH_2-\underset{\underset{O}{\|}}{C}-CF_3$$

p-Methylbenzoyltrifluoroacetone $$CH_3-\bigcirc-\underset{\underset{O}{\|}}{C}-CH_2-\underset{\underset{O}{\|}}{C}-CF_3$$

p-Ethylbenzoyltrifluoroacetone $$C_2H_5-\bigcirc-\underset{\underset{O}{\|}}{C}-CH_2-\underset{\underset{O}{\|}}{C}-CF_3$$

Examples of suitable fluorinated β-diketones containing less than three fluorine atoms are:

Fluoroacetylacetone $$CH_3-\underset{\underset{O}{\|}}{C}-CH_2-\underset{\underset{O}{\|}}{C}-CH_2F$$

Difluoroacetylacetone $$CH_3-\underset{\underset{O}{\|}}{C}-CH_2-\underset{\underset{O}{\|}}{C}-CHF_2$$

The efficiency of chelation-extraction is not the same for all of the fluorinated β-diketones. 2-thenoyltrifluoroacetone, benzoyltrifluoroacetone, and trifluoroacetylacetone are preferred fluorinated β-diketones to be used in the process of the present invention.

The organic solvent for the present invention is a substantially water-immiscible organic compound which is liquid at the temperature of carrying out the process.

Examples of suitable types of organic solvents are aromatic hydrocarbons, halogenated aromatic hydrocarbons, halogenated paraffinic hydrocarbons, and aliphatic ketones. Specific examples are benzene, toluene, chlorobenzene, hexafluoroxylene, chloroform, carbon tetrachloride, trichloroethylene, and methyl isobutyl ketone (also known as hexone). Benzene, toluene and hexafluoroxylene are the preferred solvents. When separating Pa from other metal values, the organic solvent used is an organic solvent which will not itself extract the other metal values; for example, when separating protactinium from uranium nonpolar organic solvents, such as, aromatic hydrocarbons and the halogenated hydrocarbons, are used.

The acidity of the aqueous solution is obtained by the presence of a strong inorganic acid preferably in a concentration of at least 0.05 N. The concentration of the strong inorganic acid can be varied widely; for example, satisfactory chelation-extraction of protactinium from aqueous solutions of protactinium salts have been obtained where the aqueous solutions contained as high as 16 N inorganic acid. Examples of strong inorganic acids that are suitable are as follows: nitric acid, hydrochloric acid, perchloric acid, and sulfuric acid. Nitric acid and hydrochloric acid are the preferred acids.

When protactinium is to be separated by chelation-extraction from thorium, the acidic aqueous solution has a pH of less than 0.2, since it has been found that thorium can be chelated-extracted from aqueous solutions of thorium salts when the pH of the aqueous solution is as low as 0.2 provided the concentration of the fluorinated β-diketone is sufficiently great. For this reason when separating the protactinium from a mixture of protactinium and thorium or a mixture also containing uranium in the hexavalent state and/or fission products, it is preferred that the aqueous solution contain at least 1 N strong inorganic acid and it is especially preferred that the aqueous solution contain at least 5 N strong inorganic acid. Similarly when separating protactinium from rare earth values it is preferred that the aqueous solution contain at least 1 N inorganic acid.

The temperature at which the process is carried out may be varied considerably; for example, temperatures of 10 to 60° C. are satisfactory. The preferred temperature is room temperature.

The time of contact between the aqueous solution and the chelating agent or the aqueous solution of the chelating agent of this invention is dependent upon the temperature, the organic solvent, the specific chelating agent, and numerous other factors including the efficiency of contacting the materials. While a wide range of contact time is suitable a time of at least ten minutes is preferred.

When the chelating agent, namely, the fluorinated β-diketone having the formula described above, is used with an organic solvent, the concentration of the chelating agent may be varied widely. The concentration of fluorinated β-diketone will depend upon the degree of extraction desired, upon the concentration of the protactinium salt in the initial aqueous solution, upon the acidity of the aqueous solution, and upon whether or not protactinium is to be separated from other metal values such as thorium, uranium, etc.

The ratio of the organic solvent solution to aqueous solution may be varied considerably, but the preferred range of ratio is between 10:1 and 1:10.

Examples of suitable salts of protactinium that are used in the acidic aqueous solutions from which protactinium is chelated-extracted are as follows: chlorides, nitrates, and perchlorates. The solubility of the salts varies with the acid in the aqueous solution and the concentration of strong inorganic acid; for example, the solubilities in 9.4 N nitric acid, 1.2 N nitric acid, and 9.6 N hydrochloric acid are 5.5, 0.004, and 0.3 g. of Pa per liter, respectively. The concentration of these salts can be varied widely and the concentration may be as low as tracer concentration, e.g., a concentration of the order of $10^{-8}$ to $10^{-10}$ M.

The new compounds of protactinium of this invention are compounds of protactinium in the pentavalent state and the fluorinated β-diketones. They are represented by the following general formulas:

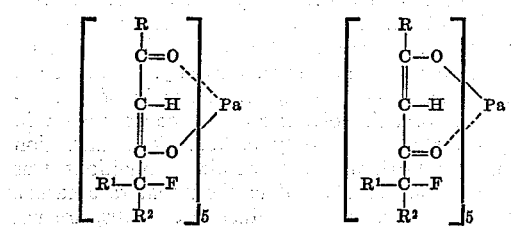

wherein R, $R^1$, and $R^2$ represent the same groups as indicated above for the general formula of the chelating agent. It is seen that there are two possible formulas for the protactinium chelate compounds, since the β-diketone may enolize in either of two ways. In either case, protactinium is bonded to the oxygen atoms by a covalent bond and a coordinate bond and due to resonance the two compunds would be identical. These compounds are solids which have a negligible solubility in water, and which are soluble in benzene, toluene, and other organic solvents. These compounds are colored and may be used to form decorative coatings. When the chelate compound is a compound of $Pa^{233}$, which is a β-emitter, a film of the chelate compound can be prepared where a film of a β-emitting material is desired.

In one embodiment of this invention the protactinium chelate compound is prepared by contacting an acidic aqueous solution containing a salt of protactinium in the pentavalent state with the fluorinated β-diketone of the type described above or with an organic solvent solution of the fluorinated β-diketone. In this embodiment the amount of fluorinated β-diketone used is preferably less than the stoichiometric amount for the formation of the pentavalent proctactinium chelate compound so that the latter when formed will not be contaminated with excess fluorinated β-diketone, when precipitated from the aqueous solution, or when extracted from the aqueous solution where organic solvent is used. The aqueous solution used in this embodiment contains the strong inorganic acid as described above. Other conditions, such as the ratio of organic solvent solution and aqueous solution, the contact time, and the temperature, are those mentioned above. When the fluorinated β-diketone is used alone the precipitated chelate compound is separated by settling, centrifugation, filtration, or other suitable means. When an organic solvent solution of the fluorinated β-diketone is used the resultant aqueous phase and organic solvent extract phase are separated, e.g., by settling or centrifugation, and the organic solvent extract phase contains a protactinium chelate compound of the fluorinated β-diketone.

In a second embodiment of the present invention protactinium is separated from an equeous solution containing the pentavalent protactinium salt by contacting the aqueous solution as described in the first embodiment. The amount of fluorinated β-diketone is preferably much greater than the stoichiometric amount for the formation of pentavalent protactinium chelate compound. In this embodiment the conditions described above for the contact time, temperature, ratio of organic solven solution to aqueous solution, etc. are used.

Protactinium may be separated from the organic solvent solution of protactinium chelate compound by contacting the organic solvent solution with an aqueous solution containing an inorganic material which contains an anion that reacts with protactinium to form a stable aniom complex containing protactinium, said protactinium-containing anion complex being water-soluble and organic solvent-insoluble, and separating the resultant organic solvent phase and aqueous extract phase containing the protactinium-containing anion complex. Hydrofluoric acid is an example of a suitable material which provides an anion that forms a protactinium-containing anion complex. The water-soluble salts of hydrofluoric acid may also be used. It is preferred that the aqueous solution also contain a strong inorganic acid in a concentration of less than 1 N. The concentration of the material which contains an anion capable of reacting with protactinium to form a stable anion complex in the aqueous solution will depend upon the volume ratio of aqueous solution and organic solvent solution, upon the amount of protactinium chelate compound in the organic solvent solution.

Protactinium may also be separated from the organic solvent solution of the chelate compound by contacting the solution with an aqueous solution of a material which forms a precipitate containing protactinium; for example, when an aqueous solution containing hydrogen peroxide or a water-soluble oxalate is used a water-insoluble and organic solvent-insoluble precipitate of a protactinium compound is obtained, thus destroying the chelate compound. The concentration of hydrogen peroxide can be varied widely; a 10% $H_2O_2$ solution free of strong inorganic acid or containing less than 1 N strong inorganic acid is especially suitable. When the protactinium concentration is too low to produce a precipitate, the protactinium compound produced is in the aqueous phase.

In a third embodiment of the present invention protactinium is separated from its aqueous solution by contacting the aqueous solution of the type described above with a chelating agent of this invention in the absence of an organic solvent and at a temperature above the melting point of the β-diketone. The amount of the fluorinated β-diketone chosen is a considerable excess so that the excess β-diketone acts as a solvent for the protactinium chelate compound.

In a fourth embodiment of this invention protactinium is separated from an aqueous solution containing salts of protactinium and thorium. The aqueous solution, as mentioned above, contains a strong inorganic acid in sufficient concentration to provide a pH value of less than 0.2, preferably in a concentration of at least 1 N. The other conditions of this embodiment are those of the second embodiment.

In another embodiment protactinium is separated from an acidic aqueous solution containing salts of protactinium and at least one rare earth element and containing at least 0.05 N, preferably at least 1 N, strong inorganic acid by chelation-extraction with the other conditions of the second embodiment.

A further embodiment comprises separating protactinium from an aqueous solution containing salts of thorium, pentavalent protactinium, and hexavalent uranium, i.e., a uranyl salt. The acidity of the aqueous solution is that of the fourth embodiment and the other conditions are those of the second embodiment.

The following examples taken alone and in combination illustrate the embodiments of this invention.

EXAMPLE I

One hundred microliters of trifluoroacetylacetone was mixed with an equal volume of benzene. The mixture was equilibrated by a 2-minute stirring period with an equal volume of 1 N nitric acid solution containing a salt of $Pa^{233}$ in a tracer concentration. By determining the β activity of the aqueous and organic solvent extract phases it was determined that 95% (3265 β counts/min.) of the protactinium had been chelated-extracted into the benzene phase.

EXAMPLE II

An aqueous solution having a measured pH of 0.65 and thus containing 0.22 N nitric acid and containing ionium salt in a tracer concentration of 23 α counts per minute per μl. was prepared.

A 200-μl. aliquot of the aqueous solution was stirred for two minutes with a mixture of 100 μl. of benzene and 100 μl. of trifluoroacetylacetone. The benzene and aqueous phase were each plated on platinum and counted for α activity. It was found that 31% of the α activity, i.e., ionium, was extracted.

Ten μl. of concentrated nitric acid was added to another 200-μl. aliquot of the aqueous solution to provide a final nitric acid concentration of 1 N. This aqueous solution was stirred for two minutes with a mixture of 100 μl. of benzene and 100 μl. of trifluoroacetylacetone. The α activity of the benzene and aqueous phases indicated that only 3% of the ionium was extracted.

These experiments show that thorium is not chelated-extracted in a substantial amount when the acidity is sufficiently great, whereas it is chelated-extracted when the acidity is low.

EXAMPLE III

A 0.5-ml. quantity of a solution containing a tracer concentration of Pa salt was evaporated to dryness and the residue was dissolved in 0.5 ml. of 5 N hydrochloric acid. 50 μl. of 1 M ammonium iodide solution and 25 μl. of 1 M hydrazine hydrochloride solution were added. The solution was heated for two minutes at 100° C. and then diluted with water to provide a final acid concentration of 0.5 N hydrochloric acid. The diluted aqueous solution was heated one minute at 100° C. A 25-μl. aliquot of the solution contained 1313 β counts per minute due to $Pa^{233}$. The aqueous solution was contacted with 5 ml. of 0.15 M 2-thenoyltrifluoroacetone in benzene using a contact time of twenty minutes. Aliquots, respectively, 25 μl. and 50 μl., of the benzene and aqueous phases, were used for determination of β activity. Since some of the benzene had volatilized during the contacting period so that the final volume of the benzene solution was only 3.8 ml., the concentration of 2-thenoyltrifluoroacetone in the benzene was then 0.2 M. The final volume of the aqueous phase was 4.7 ml. The distribution coefficient for Pa, i.e., the ratio of the concentration of Pa in the benzene phase and the concentratin of Pa in the aqueous phase, was 23.4. Using equal volumes of solutions it was calculated that 96% of Pa would be chelated-extracted.

EXAMPLE IV

A stock solution of $Pa^{233}$ and $U^{233}$ tracer as salts, with uranium as uranyl salt, that contained 8 N nitric acid, was analyzed for β activity using a 250 μl. aliquot. Another 250-μl. aliquot was extracted with twice its volume of a 0.15 M 2-thenoyltrifluoroacetone in benzene. The benzene phase was plated directly for determination of β activity. The comparison of the β activities showed that 74% of Pa had been chelated-extracted. The plated material was allowed to stand for more than 8 months and the α activity was determined. The α counts per minute in the stored plated material from the benzene phase were found to be those entirely due to the $U^{233}$ expected to have been produced by $Pa^{233}$ disintegration during the storage period. In other words, the $U^{233}$ tracer concentration in the initial aqueous solution was not chelated-extracted under the conditions of this experiment.

EXAMPLE V

An aqueous solution containing a protactinium salt and about 10 N nitric acid was contacted with 0.25 M 2-thenoyltrifluoroacetone in benzene using 2 quantities, respectively, 14 and 16 ml. of the benzene solution. The benzene extract phases contained, respectively, 0.39 and 0.21 mg. of Pa, as determined by the radioactivity of 5-μl. aliquots. The benzene extract phases were each colored a deep purple. The benzene phases were combined and contacted with an aqueous solution containing about 10% hydrogen peroxide. A 5-μl. aliquot of the resultant benzene phase was analyzed for radioactivity. Although the color of the chelate compound still persisted, the activity indicated that only 11 μg. of Pa remained in the benzene phase as chelate compound.

EXAMPLE VI

Two ml. of an aqueous solution containing 0.5 M uranyl nitrate, 0.5 N nitric acid, and a tracer concentration as nitrate of trivalent cerium was contacted with 1 ml. of 1.07 M trifluoroacetylacetone in benzene. The phases were separated after a 30-minute shaking and analyzed for cerium by its radioactivity. It was found that the extraction coefficient, i.e., the ratio of concentration in the organic solvent and the concentration in the aqueous phase, was only 0.0006. The extraction coefficient for yttrium under identical conditions was found to be 0.0071. These data show that rare earths, including, of course, fission product rare earths, are not chelated-extracted under the conditions used in this process for chelating-extracting of protactinium from acidic aqueous solutions containing at least 0.05 N strong inorganic acid.

EXAMPLE VII

Fifteen ml. of an aqeous solution containing a tracer concentration (1965 alpha counts/min./100 microliters of solution) of thorium nitrate, specifically ionium ($Th^{230}$) nitrate, was equilibrated with an equal volume of 0.25 M 2-thenoyltrifluoroacetone in benzene. After separation of the aqueous and benzene phases the radioactivity of 100-μl. aliquots of the benzene and aqueous phases was determined. Since ionium is an α-emitter the radioactivity studied was the α activity. The pH of the aqueous solution was determined by means of a glass electrode. The acidity of the aqueous phase was changed by the addition of sodium hydroxide solution and the aqueous phase was contacted further with the benzene solution of 0.25 M 2-thenoyltrifluoroacetone. After separation, aliquots of the phases were taken and analyzed as before and the pH of the aqueous phase was determined. This technique was continued to obtain chelation-extraction data at various pH values of the acidic aqueous solution. The data are presented below in Table I:

Table I

| pH of aqueous solution: | Th extracted, percent |
|---|---|
| 0.0 | 0.8 |
| 0.2 | 5.6 |
| 0.4 | 37 |
| 0.6 | 85 |
| 0.9 | 99 |
| 1.3 | 100 |
| 1.7 | 100 |
| 2.0 | 100 |
| 3.0 | 100 |
| 6.5 | 100 |

These data show there is practically no chelation-extraction of thorium when the pH of the aqueous solution was less than 0.2.

The process of the present invention may be carried out using batch or continuous conditions with equipment commonly used for cocurrent or countercurrent operation in the continuous process.

The foregoing illustrations and embodiments of this invention are not intended to limit its scope which is to be limited entirely by the appended claims.

What is claimed is:

1. A process for the separation of protactinium from an acidic aqueous solution containing a salt of protactinium in the pentavalent state and containing a strong inorganic acid, which comprises contacting said aqueous solution with a fluorinated β-diketone having the general formula:

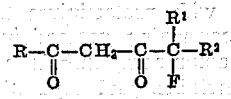

wherein R is a member of the group consisting of alkyl, aryl, aralkyl, alkaryl and heterocyclic radicals and $R^1$ and $R^2$ are members of the group consisting of hydrogen and fluorine.

2. A process for the separation of protactinium from an acidic aqueous solution containing a salt of protactinium in the pentavalent state and containing a strong inorganic acid, which comprises contacting said aqueous solution with a solution in a substantially water-immiscible organic solvent of a fluorinated β-diketone having the general formula:

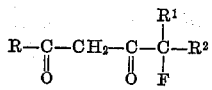

wherein R is a member of the group consisting of alkyl, aryl, aralkyl, alkaryl and heterocyclic radicals and $R^1$ and $R^2$ are members of the group consisting of hydrogen and fluorine, and separating the resultant aqueous phase and organic solvent extract phase containing a pentavalent protactinium chelate compound of the fluorinated β-diketone.

3. A process for the separation of protactinium from an acidic aqueous solution containing a salt of protactinium in the pentavalent state and containing at least 0.05 N strong inorganic acid, which comprises contacting said aqueous solution with a solution in a substantially water-immiscible organic solvent of a fluorinated β-diketone having the general formula:

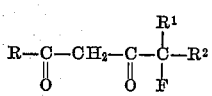

wherein R is a member of the group consisting of alkyl, aryl, aralykyl, alkaryl and heterocyclic radicals and $R^1$ and $R^2$ are members of the group consisting of hydrogen and fluorine, and separating the resultant aqueous phase and organic solvent extract phase containing a pentavalent protactinium chelate compound of the fluorinated β-diketone.

4. The process of claim 3 in which the fluorinated β-diketone is 2-thenoyltrifluoroacetone.

5. The process of claim 4 in which the organic solvent is benzene.

6. The process of claim 5 in which the inorganic acid is hydrochloric acid.

7. The process of claim 3 in which the fluorinated β-diketone is 2-thenoyltrifluoroacetone, the organic solvent is benzene, and the inorganic acid is nitric acid.

8. The process of claim 3 in which the fluorinated β-diketone is trifluoroacetylacetone.

9. The process of claim 8 in which the organic solvent is benzene.

10. The process of claim 3 in which the fluorinated β-diketone is benzoyltrifluoroacetone.

11. The process of claim 10 in which the organic solvent is benzene.

12. The process of claim 3 in which the fluorinated β-diketone is 2-thenoyltrifluoroacetone and the organic solvent is toluene.

13. The process of claim 3 in which the fluorinated β-diketone is 2-thenoyltrifluoroacetone and the organic solvent is hexafluoroxylene.

14. A process for the separation of protactinium from its mixture with thorium, which comprises contacting an acidic aqueous solution containing a protactinium salt, a thorium salt, and a strong inorganic acid to provide a pH for the solution of less than 0.2 with a solution in a substantially water-immiscible organic solvent of a fluorinated β-diketone having the general formula:

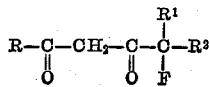

wherein R is a member of the group consisting of alkyl, aryl, aralkyl, alkaryl and heterocyclic radicals and $R^1$ and $R^2$ are members of the group consisting of hydrogen and fluorine, and separating the resultant aqueous phase containing the thorium salt and organic solvent extract phase containing a protactinium chelate compound of the fluorinated β-diketone.

15. The process of claim 14 in which the concentration of the inorganic acid is at least 1 N, the fluorinated β-diketone is 2-thenoyltrifluoroacetone, and the organic solvent is benzene.

16. The process of claim 14 in which the concentration of the strong inorganic acid is at least 1 N, the fluorinated β-diketone is trifluoroacetylacetone, and the organic solvent is benzene.

17. A process for the separation of protactinium from its mixture with uranium, which comprises contacting an acidic aqueous solution containing a protactinium salt, a uranyl salt, and a strong inorganic acid to provide a pH of less than 0.2 with a solution in a substantially water-immiscible organic solvent of a fluorinated β-diketone having the general formula:

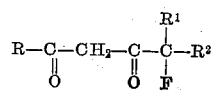

where R is a member of the group consisting of alkyl, aryl, aralkyl, alkaryl and heterocyclic radicals and $R^1$ and $R^2$ are members of the group consisting of hydrogen and fluorine, and separating the resultant aqueous phase containing the uranyl salt and organic solvent extract phase containing a protactinium chelate compound of the fluorinated β-diketone.

18. The process of claim 17 in which the concentration of the strong inorganic acid is at least 1 N, the fluorinated β-diketone is 2-thenoyltrifluoroacetone, and the organic solvent is benzene.

19. A process for the separation of protactinium from its mixture with at least one rare earth element, which comprises contacting an aqueous solution containing a protactinium salt, a salt of the rare earth element, and a strong inorganic acid in a concentration of at least 0.05 N with a solution in a substantially water-immiscible organic solvent of a fluorinated β-diketone having the general formula:

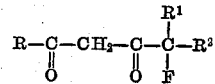

wherein R is a member of the group consisting of alkyl, aryl, aralkyl, alkaryl and heterocyclic radicals and $R^1$ and $R^2$ are members of the group consisting of hydrogen and fluorine, and separating the resultant aqueous phase containing the rare earth salt and organic solvent extract phase containing a protactinium chelate compound of the fluorinated β-diketone.

20. The process of claim 19 in which the concentration of the strong inorganic acid is at least 1 N, the fluorinated β-diketone is 2-thenoyltrifluoroacetone, and the organic solvent is benzene.

References Cited in the file of this patent

UNITED STATES PATENTS

| | | |
|---|---|---|
| 2,161,184 | McKone et al. | June 6, 1939 |
| 2,227,833 | Hixson et al. | Jan. 7, 1941 |

OTHER REFERENCES

Villar: "Journal of Chemical Education," vol. 19, pages 329–330 (1942).

Seaborg: "Chemical and Engineering News," vol. 23, No. 23, pages 2190–2193 (1945).

Harvey: "Nucleonics," April 1948, pages 30–39.